United States Patent
Hallisey et al.

(10) Patent No.: US 9,611,947 B2
(45) Date of Patent: Apr. 4, 2017

(54) VALVE ASSEMBLY AND METHOD OF CONTROLLING FLOW OF FLUID

(71) Applicant: GE Aviation Systems LLC, Grand Rapids, MI (US)

(72) Inventors: Kevin Patrick Hallisey, Durand, IL (US); Christopher Michael Dunn, Roscoe, IL (US); Richard George Hext, III, Belvidere, IL (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 0 days.

(21) Appl. No.: 14/734,098

(22) Filed: Jun. 9, 2015

(65) Prior Publication Data
US 2016/0363228 A1    Dec. 15, 2016

(51) Int. Cl.
*F16K 15/03* (2006.01)
*F02C 7/26* (2006.01)
*F16K 11/052* (2006.01)

(52) U.S. Cl.
CPC ............. *F16K 15/033* (2013.01); *F02C 7/26* (2013.01); *F05D 2260/85* (2013.01); *F16K 11/052* (2013.01); *Y10T 137/2544* (2015.04); *Y10T 137/2554* (2015.04)

(58) Field of Classification Search
CPC .... F02C 7/26; F02C 7/27; F02C 7/268; F02C 7/277; F05D 2260/85; F16K 15/033; F16K 11/052; Y10T 137/2544; Y10T 137/2554
See application file for complete search history.

(56) References Cited

U.S. PATENT DOCUMENTS

| | | | | |
|---|---|---|---|---|
| 2,035,747 A | * | 3/1936 | Harris | F16K 11/052 137/625.44 |
| 2,044,921 A | * | 6/1936 | Swanland | F16K 15/03 137/112 |
| 2,365,095 A | * | 12/1944 | Miller | F15B 11/22 137/101 |
| 3,414,232 A | | 12/1968 | Hellman | |
| 3,592,221 A | * | 7/1971 | Worley | F16K 11/052 137/375 |
| 3,705,602 A | | 12/1972 | Nordin et al. | |
| 3,828,806 A | * | 8/1974 | Glos, II | F16K 11/052 137/102 |

(Continued)

FOREIGN PATENT DOCUMENTS

| | | |
|---|---|---|
| EP | 1493951 B1 | 12/2007 |
| EP | 1852641 B1 | 12/2008 |

(Continued)

*Primary Examiner* — Craig Schneider
*Assistant Examiner* — Kevin Barss
(74) *Attorney, Agent, or Firm* — GE Global Patent Operation; William S. Munnerlyn

(57) ABSTRACT

A valve assembly includes a plenum having first, second, and third air source ports, a flapper valve assembly pivotally movable between a first position, where the first air source port is closed by the flapper valve assembly and the second and third air source ports are open and in fluid communication, and a second position, where the second air source port is closed by the flapper valve assembly and the first and third air source ports are open and in fluid communication and a method of controlling fluid flow via a valve assembly.

12 Claims, 5 Drawing Sheets

(56) References Cited

U.S. PATENT DOCUMENTS

| | | | | |
|---|---|---|---|---|
| 3,866,628 A * | 2/1975 | Weber | .................... | E21B 23/002 137/625.44 |
| 3,897,773 A * | 8/1975 | Burt | ...................... | F16K 11/052 110/163 |
| 3,974,848 A * | 8/1976 | Wheatley | .............. | F16K 11/052 137/102 |
| 4,718,457 A * | 1/1988 | Luger | .................... | F16K 11/052 137/875 |
| 4,773,439 A * | 9/1988 | Coates-Smith | ........ | F16K 11/052 137/102 |
| 4,919,169 A * | 4/1990 | Bachmann | ............. | F16K 11/052 137/875 |
| 5,176,658 A * | 1/1993 | Ranford | ................ | A61M 39/24 137/102 |
| 5,439,022 A * | 8/1995 | Summers | ............. | A61M 1/0062 137/102 |
| 5,697,596 A * | 12/1997 | Kremers | ............... | F16K 11/052 137/875 |
| 5,908,047 A * | 6/1999 | Nakamura | .............. | F01N 3/027 137/625.44 |
| 6,029,444 A * | 2/2000 | Nakamura | .............. | F01N 3/027 60/311 |
| 6,098,661 A | 8/2000 | Yim et al. | | |
| 6,182,699 B1 * | 2/2001 | Hawkes | ................ | F16K 11/052 137/861 |
| 6,397,874 B1 * | 6/2002 | Featheringill | ........... | E03F 1/006 137/112 |
| 6,644,352 B1 * | 11/2003 | Pfetzer | ............... | B60H 1/00485 137/625.44 |
| 6,647,740 B2 * | 11/2003 | Noritake | ............... | F16K 11/052 62/186 |
| 6,648,018 B2 * | 11/2003 | Gagnon | ................. | F16K 11/052 137/875 |
| 7,082,944 B2 | 8/2006 | Gossweiler | | |
| 7,086,416 B2 * | 8/2006 | Kurian | ................ | F16K 27/0272 137/625.44 |
| 7,534,074 B2 * | 5/2009 | Kato | ...................... | B65G 53/56 137/875 |
| 7,686,382 B2 * | 3/2010 | Rober | .................. | B62D 35/007 296/180.1 |
| 8,091,858 B2 * | 1/2012 | Janich | ................... | F16K 11/052 137/875 |
| 8,522,810 B2 * | 9/2013 | Armstrong | ........... | A47L 15/4221 134/56 D |
| 2006/0283513 A1 * | 12/2006 | Kurian | ................ | F16K 27/0272 137/875 |
| 2007/0272308 A1 * | 11/2007 | Spears | ................... | F16K 15/03 137/527.8 |
| 2009/0014674 A1 * | 1/2009 | Grissom | ................ | F01D 17/145 251/298 |
| 2014/0150399 A1 * | 6/2014 | Schawag | ............... | F01D 25/30 60/39.5 |

FOREIGN PATENT DOCUMENTS

| | | |
|---|---|---|
| WO | 9516156 A1 | 6/1995 |
| WO | 9707354 | 2/1997 |

* cited by examiner

VALVE ASSEMBLY AND METHOD OF CONTROLLING FLOW OF FLUID

BACKGROUND OF THE INVENTION

In a typical aircraft, pneumatic (air) systems are used for a variety of purposes including but not limited to Environmental Control Systems (ECS), Engine Starting Systems, and De-Icing Systems. Power sources for the pneumatic systems generally initiate from the aircraft gas turbine engines or the auxiliary power unit (APU).

In a typical gas turbine engine, a compressor compresses air and passes that air along a primary flow path to a combustor where it is mixed with fuel and combusted. The combusted mixture expands and is passed to a turbine, which is forced to rotate due to the passing combusted mixture. When used on an aircraft, the primary purpose of this system is to provide propulsive force for the aircraft. A portion of the air compressed within the engine can be diverted from the primary flow path and be utilized in an air supply system. More specifically, a portion of the air can be diverted to a bleed inlet of a bleed air system. This compressed bleed air can be delivered to the airframe for various purposes, for example environmental control system (ECS). The bleed air flow from the engine can be over 900° F. (593° C.) and pressures over 350 psi.

The typical APU is a small turbine engine used to provide pneumatic, hydraulic and electrical power to the aircraft when the main gas turbine engines is not in operations either on the ground or in emergencies when the aircraft is in flight. Operation of the APU is similar to that of a typical gas turbine engine however the primary purpose of this system is to provide power to the electrical, hydraulic, and air supply systems.

The air supply system can include any number of systems including, but not limited to an engine starting system. An air turbine starter (ATS) is used to initiate the turbine engine rotation and is powered by the APU. The ATS is often mounted near the engines of the aircraft and the ATS can be coupled to a high pressure fluid source, such as compressed air, which impinges upon a turbine wheel in the ATS causing it to rotate at a relatively high rate of speed. The ATS includes an output shaft that is coupled to the turbine wheel and, perhaps via one or more gears, to the jet engine. The output shaft thus rotates with the turbine wheel. This rotation in turn causes the jet engine to begin rotating.

BRIEF DESCRIPTION OF THE INVENTION

In one embodiment, the invention relates to a valve assembly having a plenum having first, second, and third air source ports, a flapper valve-assembly pivotally movable between a first position, where the first air source port is closed by the flapper valve assembly and the second and third air source ports are open and in fluid communication, and a second position, where the second air source port is closed by the flapper valve assembly and the first and third air source ports are open and in fluid communication, a biasing device imparting a biasing force to the flapper valve assembly to bias the flapper valve assembly into the first position to close off the first air source port, and an air dam provided on the flapper valve assembly to confront the first air source port when the flapper valve assembly is in the first position, wherein air acting on the air dam generates a pressure force opposing the biasing force.

In another embodiment, the invention relates to a valve having a flapper valve assembly pivotally movable between a first position and a second position, a biasing device imparting a biasing force to the flapper valve assembly to bias the flapper valve assembly into the first position, and an air dam projecting from the flapper valve assembly such that air acting on the air dam generates a pressure force opposing the biasing force.

In yet another embodiment, the invention relates to a method of controlling the flow of fluid through a plenum having first, second, and third air source ports, the method includes applying a biasing force on the flapper valve assembly, which is movable between a first position, where the first air source port is closed, and second position, where the second air source port is closed, to bias the flapper valve assembly from the second position toward the first position to close the first air source port, and applying pressurized air against an air dam on the flapper valve assembly through the first air source port at a pressure to overcome the biasing force to move the flapper valve assembly from the first position to the second position to close off the second air source port, wherein when air flow is desired between the first and third air source ports, the pressurized air is applied against the air dam, and when airflow is desired between the second and third ports, the pressurized air is not applied against the air dam.

DESCRIPTION OF EMBODIMENTS OF THE INVENTION

Figure 1:
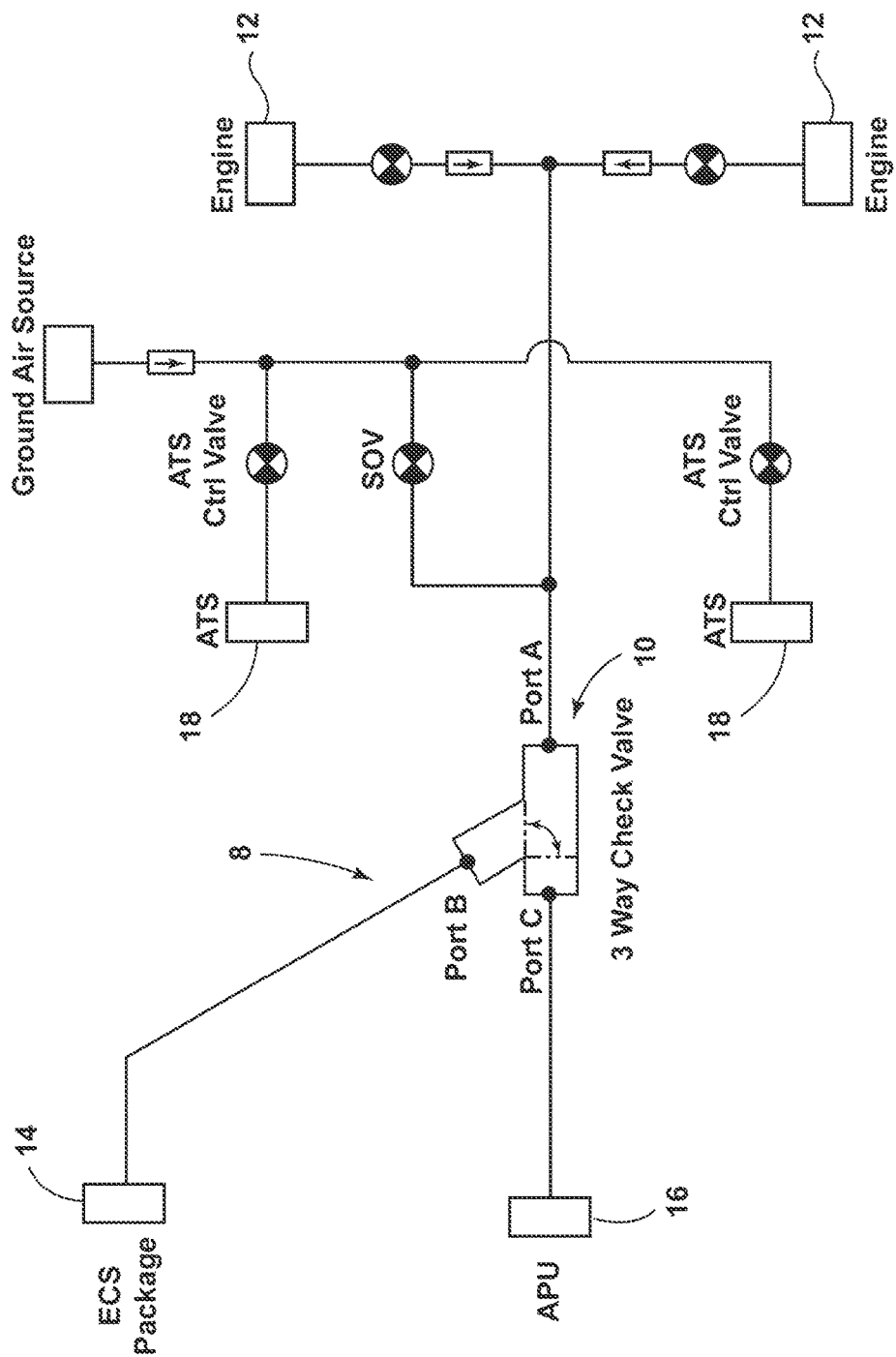
FIG. 1 is a schematic view of systems within an aircraft in which embodiments of the invention can be implemented including a three-way check valve assembly.

Embodiments of the invention relate to a check valve assembly, such as 3-way check valve assembly 10, and controlling a flow of fluid therewith. FIG. 1 schematically depicts a system diagram, which illustrates an exemplary environment of the 3-way check valve assembly 10 in an air supply system 8 of an aircraft. While a number of elements are shown as being included in the air supply system 8 the remainder of the description will focus on airflow with respect to one or more engines 12, an Environmental Control System (ECS) 14, auxiliary power unit (APU) 16, and air turbine starter (ATS) 18. The 3-way check valve assembly 10 is placed such that it is in the path of bleed air from the engines 12 to the ECS 14 and also in the path of air from the APU 16 to the ATS 18. However, the 3-way check valve assembly can be used to control the flow of fluid between other components, and can be used in environments other than an aircraft.

During starting of the engines 12, the 3-way check valve assembly 10 allows flow in the direction from the APU 16 to the ATS 18 and shuts off the flow path to the ECS 14. In this manner, a flow of compressed air from the APU 16 can be provided to the ATS 18 to start the rotation the engine 12.

During the normal operation with the engines 12 running, the ATS 18 is not used and is at idle. In such an instance, the 3-way check valve assembly 10 closes the flow to the APU 16 and allows the bleed air to flow from the engines 12 to the ECS 14. The bleed air flow from the engines 12 can be provided from any suitable portion of the engines 12 including a compressor section or a turbine section.

The inclusion of the 3-way check valve assembly 10 allows for common ducting to be utilized in the air supply system 8 from the 3-way check valve assembly 10 to the engines 12 and the ATS 18. In this manner, the inclusion of the 3-way check valve assembly 10 eliminates a separate duct run that can be in excess of 30 feet. Further, the inclusion of the 3-way check valve assembly 10 can enable, at a minimum, the elimination of an entire valve mechanism, which can weigh approximately 10 pounds.

Figure 2:
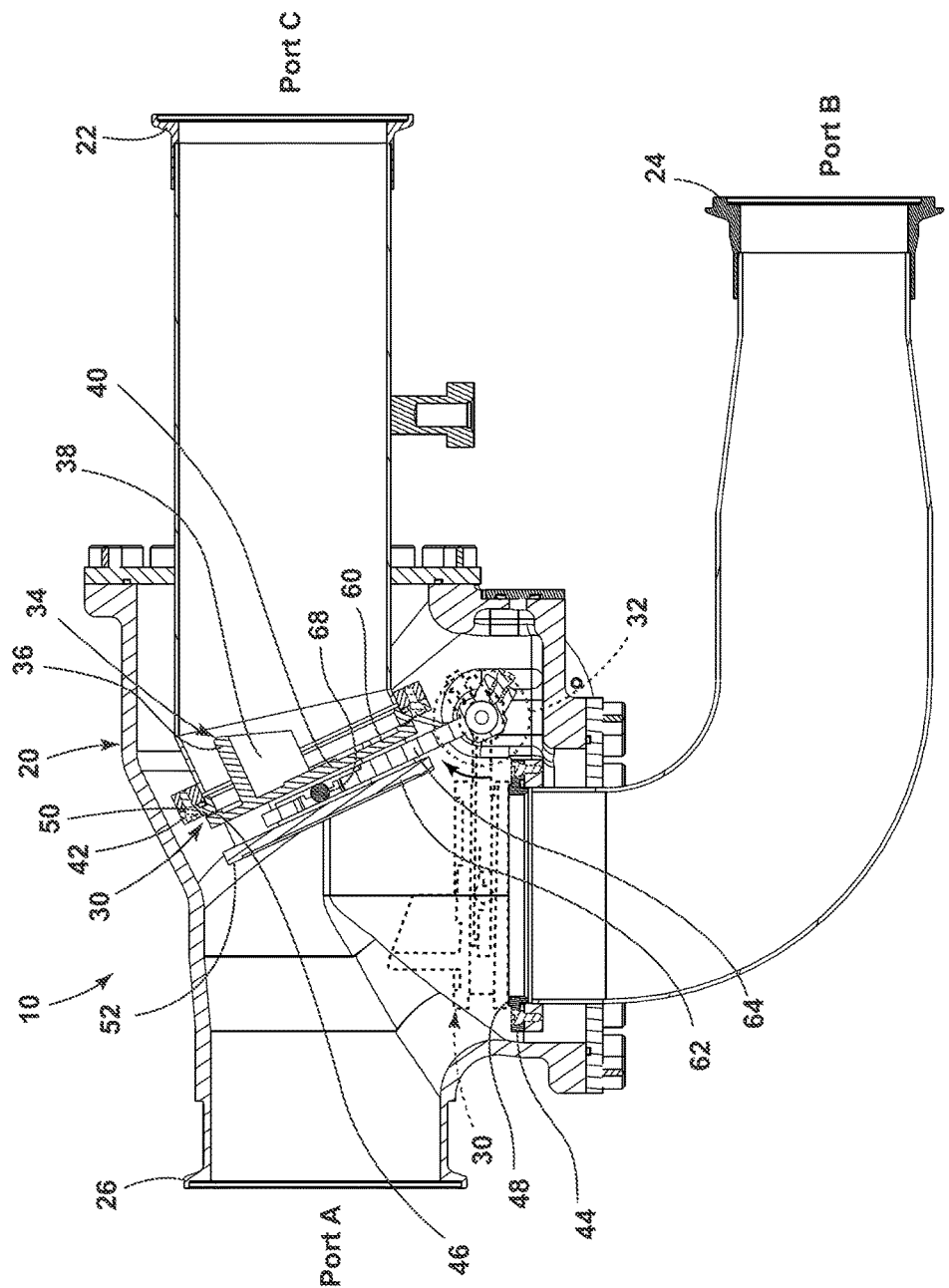
FIG. 2 is a cross-sectional view of a three-way check valve assembly according to an embodiment of the invention.

FIG. 2 more clearly illustrates an exemplary 3-way check valve assembly 10. A plenum 20 having a first air source port 22, a second air source port 24, and a third air source port 26 as well as a flapper valve body or flapper valve assembly 30 are included within the 3-way check valve assembly 10. The first air source port 22 corresponds to Port C in FIG. 1, which leads to the APU 16, a second air source port 24 corresponds to Port B in FIG. 1, which leads to the ECS 14, and a third air source port 26 corresponds to Port A in FIG. 1, which leads to the engines 12 and the ATS 18.

The flapper valve assembly 30 is pivotally movable between a first position and a second position (shown in phantom). In the first position, such as described above for normal operation with the engines 12 running, the first air source port 22 is closed by the flapper valve assembly 30 and the second air source port 24 and third air source port 26 are open and in fluid communication. In the second position, such as described above for starting of the engines 12, the second air source port 24 is closed by the flapper valve assembly 30 and the first air source port 22 and third air source port 26 are open and in fluid communication.

A biasing device 32 (shown schematically in phantom) imparts a biasing force to the flapper valve assembly 30 to bias the flapper valve assembly 30 into the first position to close off the first air source port 22. The biasing device 32 can be any suitable biasing device including, but not limited to, a torsion spring.

In the exemplary embodiment, an air dam 34 is provided on the flapper valve assembly 30 to confront the first air source port 22 when the flapper valve assembly 30 is in the first position and air acting on the air dam 34 generates a pressure force opposing the biasing force imparted by the biasing device 32. The air dam 34 can be formed in any suitable manner including, by way of non-limiting example, that the air dam 34 can include a wall 36 projecting from the flapper valve assembly 30. The wall 36 is shaped to avoid contact with the plenum 20 or the first air source port 22. The wall 36 defines a face 38 that confronts fluid flowing from the first air source port 22 to the third air source port 26 when the flapper valve assembly 30 is in the second position. The face 38 is generally perpendicular to a flow of fluid from the first air source port 22 to the third air source port 26. The wall 36 can be spaced from a geometric center 40 of the flapper valve assembly 30.

The flapper valve assembly 30 can be offset within the plenum 20. More specifically, the flapper valve assembly 30 can be located such that when it is in the second position it is below a majority of the fluid flow from the first air source port 22 to the third air source port 26. This reduces the pressure drop of the fluid as it moves through the plenum 20. A portion of the first air source port 22 has also been illustrated as being angled towards the third air source port 26; this can also decrease the pressure drop of the fluid as it moves through the plenum 20.

The first air source port 22 has been illustrated as including a first valve seat 42 and the second air source port 24 has been illustrated as including a second valve seat 44. The first and second valve seats 42 and 44 can be replaceable sealing seats mounted to the first air source port 22 and the second air source port 24, respectively. The first and second valve seats 42 and 44 have predetermined sealing faces 46 and 48, respectively. The flapper valve assembly 30 has complementary sealing faces 50 and 52 to fluidly seal the flapper valve assembly 30 and the first valve seat 42 or the second valve seat 44 depending on the position the flapper valve assembly 30 is in.

Figure 3:
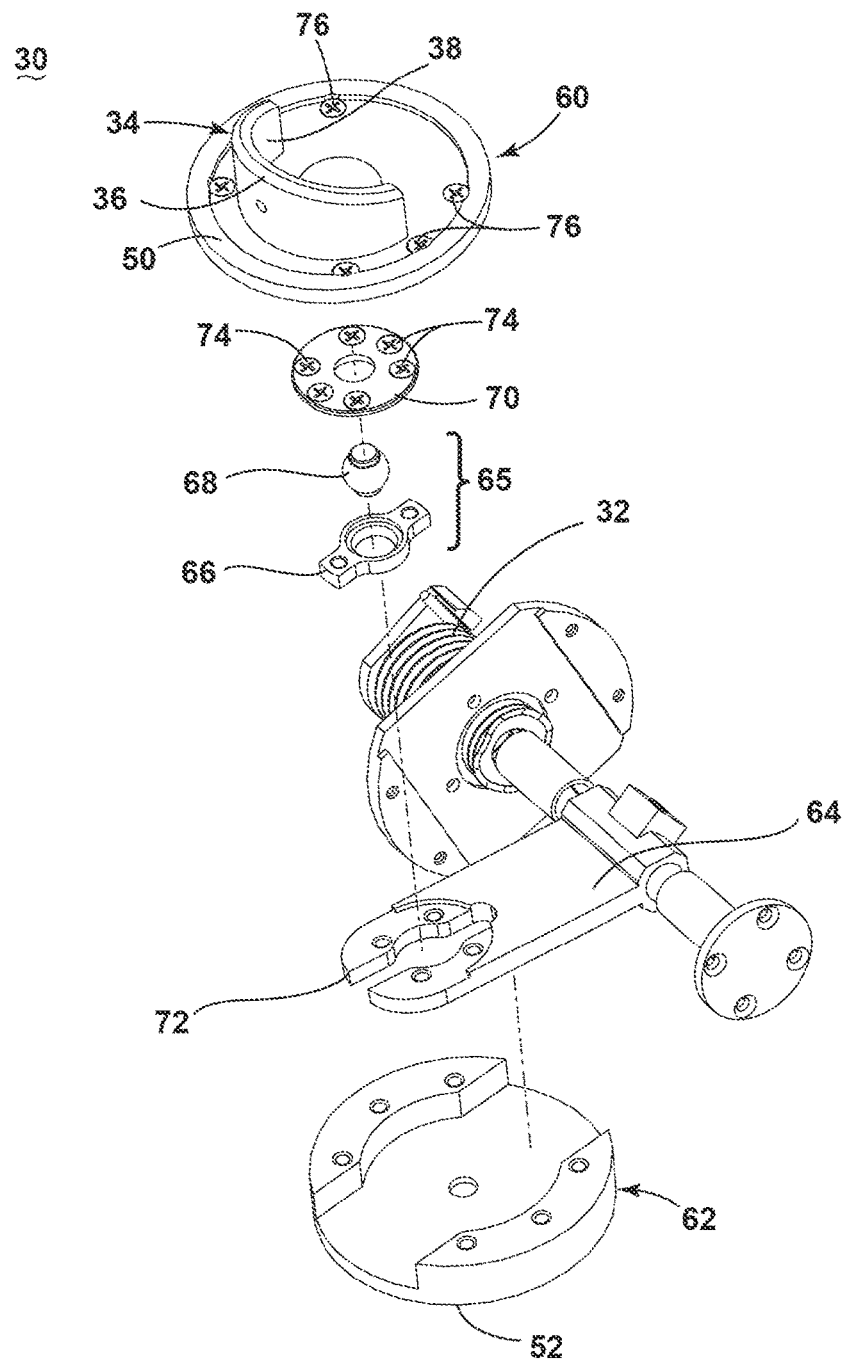
FIG. 3 is an exploded view of a portion of the three-way check valve assembly of FIG. 2.

As illustrated more clearly in the exploded view of FIG. 3, the flapper valve assembly 30 includes a first plate 60 and a second plate 62, which form opposing sides of the flapper valve assembly 30. A first contoured sealing surface or sealing face 50 is provided on the first plate 60 and a second contoured sealing surface or sealing face 52 is provided on the second plate 62. A flapper 64 forms a portion of the flapper valve assembly 30. The flapper 64 is operably coupled to the biasing device 32 can be located between the first plate 60 and the second plate 62. The first plate 60 and the second plate 62 can be operably coupled with any type of suitable fasteners including, but not limited to, screws 76.

A pivot in the form of a gimbal mechanism 65 is included within the flapper valve assembly 30 and is configured to allow the first plate 60 and the second plate 62 to tilt. As illustrated, a socket 66, a ball 68 and a cover 70 can be included in the gimbal mechanism 65. The ball 68 can be provided within the socket 66 and the socket can be located within a portion 72 of the flapper 64 and mounted thereto utilizing the cover 70 and fasteners 74. Portions of the ball 68 interface with the first plate 60 and the second plate 62 allowing them to oscillate or tilt about the gimbal mechanism 65. More specifically, the first plate 60 or the second plate 62 are located on either side of the gimbal mechanism 65 and when a portion of the first plate 60 or the second plate 62 contacts a portion of the first air source port 22 or the second air source port 24 the respective plate can tilt so that it fluidly seals against the port.

Typically seals, such as O-rings, could be utilized to ensure that the sealing faces 50 and 52 fluidly sealed against the first and second valve seats 42 and 44; however, because the 3-way check valve assembly 10 is utilized in an environment that operates in high temperatures, upwards of 900° F., such seals would quickly degrade and are impractical. The gimbal mechanism 65 aids in ensuring that the sealing faces 50 and 52 fluidly seal against the first and second valve seats 42 and 44 even if the flapper valve assembly 30 is not perfectly aligned.

Figure 4:
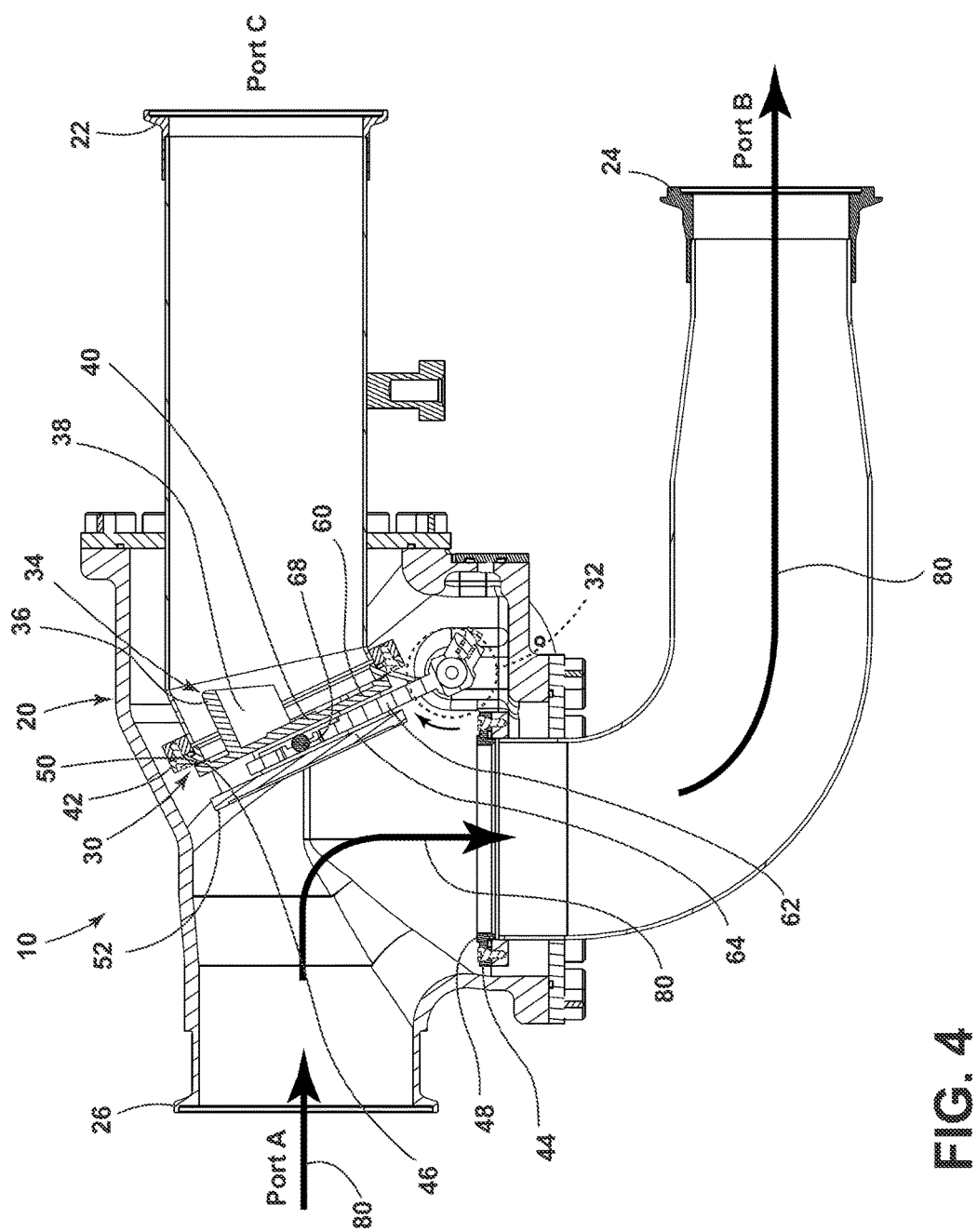
FIG. 4 is a cross-sectional view of the valve assembly of FIG. 2 in a first position and illustrating exemplary air flows.
Figure 5:
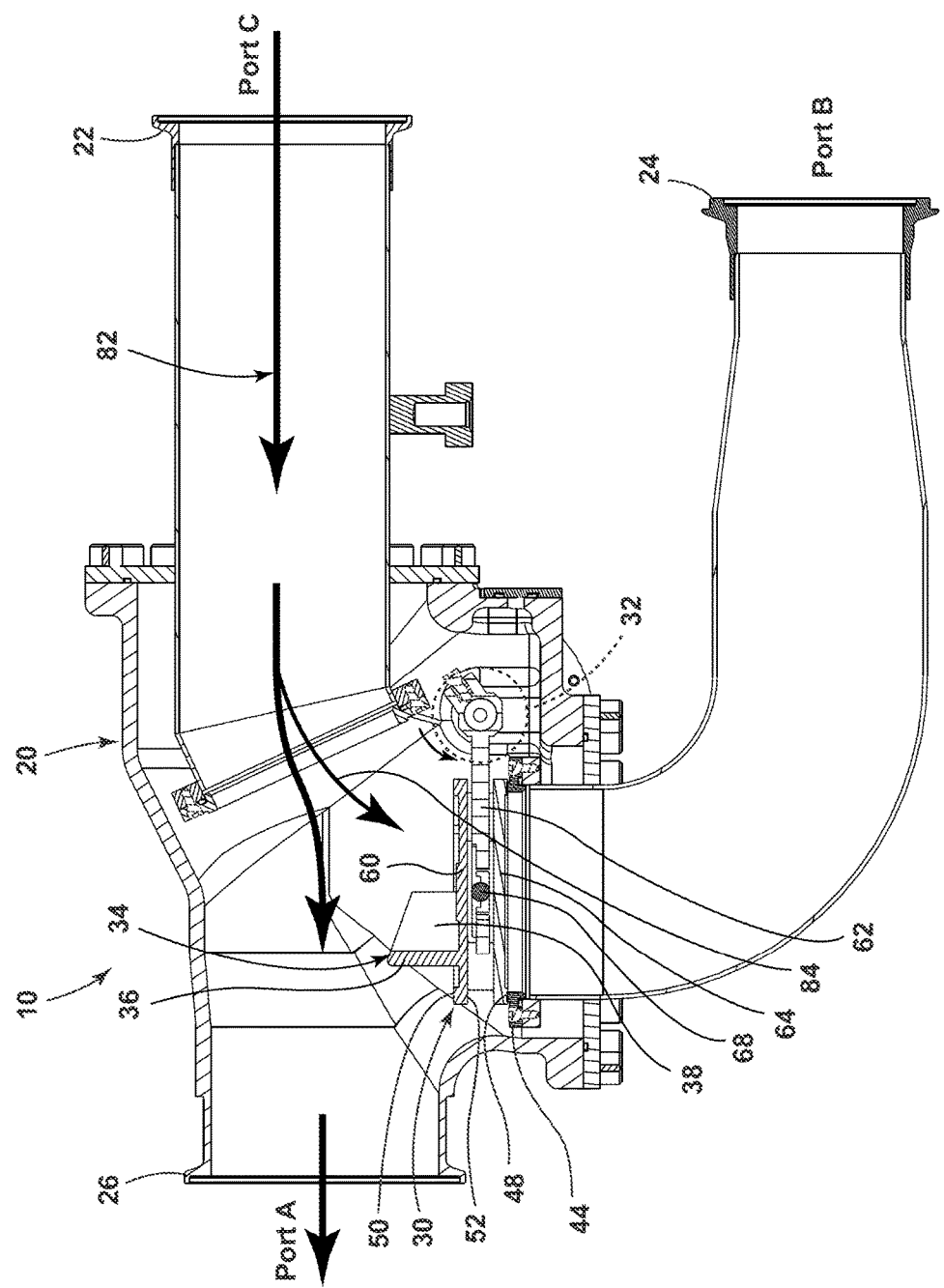
FIG. 5 is a cross-sectional view of the valve assembly of FIG. 2 in a second position and illustrating exemplary air flows.

The operation of the 3-way check valve assembly 10 will now be described with respect to FIGS. 4 and 5 with the operation beginning with the 3-way check valve assembly 10 starting in a normally closed position where the flapper valve assembly 30 closes the first air source port 22. The 3-way check valve assembly 10 can be utilized in a method of controlling a flow of fluid. For example, this can include applying a biasing force on the flapper valve assembly 30 to bias the flapper valve assembly 30 from the second position toward the first position to close the first air source port 22. FIG. 4 illustrates the assembly in a "normal flow path" condition such as when the engines 12 are operating normally. The incoming flow through third air source port 26 and Port A is directed toward second air source port 24 and port B as indicated by arrow 80. In such a condition fluid entering from port A or third air source port 26 has a higher static pressure than fluid in first air source port 22, which helps to keep the 3-way check valve assembly 10 in its first position. Further, the biasing force from the biasing device 32 included in the 3-way check valve assembly 10 keeps the 3-way check valve assembly 10 in its first position and keeps the first air source port 22 closed.

Conversely, during starting of the engines 12 the first air source port 22 has a higher dynamic pressure than the second air source port 24 and third air source port 26. The higher dynamic pressure from the first air source port 22 is utilized to overcome the biasing force provided by the biasing device 32 and move the flapper valve assembly 30 to the second position. FIG. 5 illustrates the assembly in such an altered condition, such as when starting the engines 12. More specifically, pressurized air from the first air source port 22 is applied against the flapper valve assembly 30 including the air dam 34 at a pressure that overcomes the biasing force, provided by the biasing device 32, to move the flapper valve assembly 30 from the first position to the second position. As the pressure is higher at the first air source port 22, fluid flow from Port C or the first air source port 22 pushes and moves the flapper valve assembly 30 until the flapper valve assembly 30 fluidly seals against the second valve seat 44 and shuts the path to the second air source port 24. This establishes a fluid flow, indicated with arrow 82, between the first air source port 22 and the third air source port 26. At least a portion of the flowing fluid, indicated with arrow 84, impacts the air dam 34 when the flapper valve assembly 30 is in the second position and such fluid impacting the air dam 34 is sufficient to maintain the flapper valve assembly 30 in the second position. The geometry, shape, or profile of the plenum 20 and the air dam 34 can be such that the pressure drop from port C to port A is minimized while overcoming the biasing device 32 and allowing the flapper valve assembly 30 to seal in its second position.

Unlike typical flapper valves, which can only partially close or bounce upwards or downwards, the flapper valve assembly 30 is biased and retained in the first position by the biasing force provided by the biasing device 32 or the valve body 30 is forced and retained in place by the pressure exerted on the air dam 34. Thus, when air flow is desired between the first air source port 22 and third air source port 26, the pressurized air is applied against the air dam 34, and when airflow is desired between the third air source port 26 and second air source port 24, the pressurized air is not applied against the air dam 34. Further, when the system is shut down the flapper valve assembly 30 will close in the first position as it is biased by the biasing device 32.

As described, the flow systems connected to the 3-way check valve assembly 10 determine how it operates and no control mechanism is required for operation. Alternatively, an external device configured to activate the 3-way check valve assembly 10 could be included and operably coupled to the flapper 64. Such an external device could include a rotary actuator such as, but not limited to, a motor and be utilized to move the flapper valve assembly 30. However, this would require a controller or on/off switch, which would increase the cost and complexity of such a valve assembly. Further, because the 3-way check valve assembly 10 is utilized in an environment that operates in high temperatures the use of electronics to operate the 3-way check valve assembly 10 can be impractical. While embodiments of the invention illustrated and described above relate to a 3-way check valve it will be understood that embodiments of the invention are applicable to all suitable types of check valve assemblies including 1-way, 2-way, etc.

The above-described embodiments provide for a variety of benefits including that they consolidate the function of two separate valves into one and results in reduced internal volume and system weight. Not only does this reduce the weight of the valving but it results in minimizing the number of duct runs and controls as well. The above-described embodiments provide a simple mechanism and reduced cost. The simple mechanism can contribute to enhanced product reliability and reduced maintenance costs.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A valve assembly comprising:
   a plenum having first, second, and third air source ports;
   a flapper valve assembly pivotally movable between a first position, where the first air source port is closed by the flapper valve assembly and the second and third air source ports are open and in fluid communication, and a second position, where the second air source port is closed by the flapper valve assembly and the first and third air source ports are open and in fluid communication;
   a biasing device imparting a biasing force to the flapper valve assembly to bias the flapper valve assembly into the first position to close off the first air source port; and
   an air dam provided on the flapper valve assembly to confront the first air source port when the flapper valve assembly is in the first position, wherein the air dam includes a wall, shaped to avoid contact with the plenum or the first air source port, projecting from the flapper valve assembly, and air acting on the air dam generates a pressure force opposing the biasing force.

2. The valve assembly of claim 1 wherein at least one of the second and third air source ports has a higher static pressure than the first air source port.

3. The valve assembly of claim 2 wherein the first air source port has a higher dynamic pressure than the at least one of the second and third air source port.

4. The valve assembly of claim 1 wherein at least one of the first and second air source ports includes a valve seat.

5. The valve assembly of claim 4 wherein the valve seat has a predetermined sealing face and the flapper valve assembly has a complementary sealing face, which abuts the predetermined sealing face to fluidly seal the flapper valve assembly and the valve seat.

6. The valve assembly of claim 5 wherein both of the first and second air source ports include a valve seat with a predetermined sealing face and the flapper valve assembly includes a complementary sealing face for both of the predetermined sealing faces.

7. The valve assembly of claim 1 wherein the wall defines a face that confronts fluid flowing from the first air source port to the third air source port when the flapper valve assembly is in the second position.

8. The valve assembly of claim 7 wherein the face is generally perpendicular to a flow of fluid from the first air source port to the third air source port.

9. The valve assembly of claim 8 wherein the wall is spaced from a geometric center of the flapper valve assembly.

10. The valve assembly of claim 1 wherein a geometry of the plenum and a geometry of the air dam ore configured to minimize a pressure drop from the first air source port to the third air source port while overcoming the biasing force and allowing the flapper valve assembly to seal in the second position.

11. A valve comprising:
a flapper valve assembly pivotally movable between a first position and a second position, wherein the flapper valve assembly includes opposing sides and a contoured sealing surface is provided on at least one of the opposing sides;
a biasing device imparting a biasing force to the flapper valve assembly to bias the flapper valve assembly into the first position;
an air dam projecting from the flapper valve assembly such that air acting on the air dam generates a pressure force opposing the biasing force; and
a gimbal mechanism operably coupled between the opposing sides of the flapper valve assembly, and configured to allow the opposing sides to tilt about the gimbal mechanism.

12. The valve of claim 11 wherein the air dam has a face that is generally perpendicular to the flapper valve assembly.

* * * * *